Patented Nov. 7, 1944

2,362,094

UNITED STATES PATENT OFFICE 2,362,094

POLYMERIC DIHALO-ETHYLENE COMPOUND

Mary W. Renoll, Dayton, Ohio, assignor to Monsanto Chemical Company, St. Louis, Mo., a corporation of Delaware No Drawing. Application July 19, 1940, Serial No. 346,346

8 Claims. (Cl. 260—92.5)

This invention relates to polymeric 1-chloro-1-fluoro-ethylene and a process for preparing the same.

Monomeric 1-chloro-1-fluoro-ethylene and a process for preparing the same have been described and claimed in a co-pending United States patent application, Serial Number 346,345 filed July 19, 1940, in the name of Mary W. Renoll. According to the present invention, this new unsaturated organic compound has been found to polymerize readily to produce a polymeric material possessing new and useful properties. These new polymerization products are, as hereinafter shown, rubbery solids over a wide extent of polymerization and can be softened and worked at moderate temperatures well below their decomposition temperatures. They are generally soluble in such common and inexpensive solvents as dioxane, acetone, ethyl acetate, chloroform and benzene. Furthermore, these polymers are characterized by being non-inflammable.

The hereinbefore described properties of the polymerization products of 1-chloro-1-fluoro-ethylene are most unexpected and entirely unforeseen. Thus, for example, previously described polymeric products obtained by subjecting 1,1-dichloro-ethylene, a related material, to polymerizing conditions possess entirely different properties. These prior products, in contrast to the products of the present invention, are obtained in a variety of physical forms, e. g. powder, soft porous solid, or hard bone-like material depending on the extent of polymerization; they are insoluble in organic solvents as, for example, chloroform and benzene and soften and can be worked, in general, only at very high temperatures.

It is obvious that the new products of the present invention possess properties that are very desirable for certain uses and are superior in this respect to said prior materials. Thus, for example, the products of the present invention may be readily molded by virtue of being easily worked at moderate temperatures and are readily adapted for coating purposes by virtue of their solubility. In contrast to prior halogen-containing vinyl polymers in general, the products of this invention tend to withstand the deleterious effects of ultraviolet light rays to a much greater extent. Furthermore, in contrast to prior non-halogen-containing thermoplastic polymers, these new products are much superior in that they are non-inflammable while said prior materials, in general, tend to be relatively inflammable.

According to the present invention, the polymerization of 1-chloro-1-fluoro-ethylene can be carried out by any convenient means. Thus, polymerization may be effected with or without the presence of a solvent or the monomer may be polymerized in an emulsion with a liquid relatively immiscible therewith. Various types of catalysts may be employed, if desired. Thus, peroxide catalysts, as for example, acetyl peroxide, have been found to accelerate the rate of polymerization. A convenient method of polymerization is to heat the monomer with or without the addition of a suitable catalyst in a vessel capable of withstanding pressure and lined, for example, with glass or stainless steel to prevent corrosion and consequent discoloration of the product. It is, however, generally desirable to carry out the polymerization at moderate temperatures. Thus, temperatures of substantially 50° C. and under, and more particularly, between about 20° C. and 40° C., have been found to produce very desirable polymers.

The following examples are illustrative of this invention but not limitative of the scope thereof. All parts are by weight.

Example 1

25 parts of 1-chloro-1-fluoro-ethylene were polymerized in the absence of a catalyst for 6 days at 20 C. in a stainless steel vessel capable of withstanding pressure. The product was purified in a suitable manner, as for example, by treating said product with acetone to dissolve the polymer and then precipitating out the polymer by the addition of water to the acetone solution and finally by drying in a vacuum at room temperature. As a result of the foregoing procedure, an 8 per cent yield of a thermoplastic, white, rubbery solid was obtained. The product had a relatively low softening point, and was soluble in dioxane, ethyl acetate, and acetone, and substantially soluble in chloroform and benzene. From this polymeric produce clear films were readily formed by suitable means. Exposure of a film of this polymer to the rays from a General Electric S-1 mercury vapor sun lamp at a distance of substantially 16 inches resulted in only slight discoloration after 108 hours.

Example 2

13 parts of 1-chloro-1-fluoro-ethylene were polymerized at 30° C. for 20 days in the presence of a suitable catalyst, for example, 0.77% by weight of acetyl peroxide. The polymerization was carried out in a closed glass-lined vessel capable of withstanding pressure and the product was purified in the same manner as the product in Example 1. As a result of the foregoing procedure, a 68% yield of a thermoplastic, colorless, soft, rubbery solid was obtained. The product would not burn and was soluble in dioxane, benzene, ethyl acetate, chloroform and acetone. The light resistance of a film of this material was similar to that of the product in Example 1. In film form this product was clear, and in this respect, also, resembled the product in Example 1.

*Example 3*

13 parts of 1-chloro-1-fluoro-ethylene were polymerized in the absence of a catalyst at 50° C. for 15 days in a closed glass-lined vessel capable of withstanding pressure. The product was purified in the same manner as the product in Example 1. As a result of the foregoing procedure, an 86% yield of a thermoplastic, rubbery solid was obtained. This product possessed properties similar to those of the product in Example 2.

It can be readily seen from Examples 1, 2 and 3 and previous statements that 1-chloro-1-fluoro-ethylene can be polymerized under a variety of conditions. While there may be minor differences in the properties of the products obtained under the various polymerization conditions, the polymers, in general, possess the useful properties of non-inflammability, solubility in many common and relatively inexpensive solvents, a rubbery character over a wide extent of polymerization and good light resistance even in the absence of stabilizing agents. While a suitable method of purification has been given in the examples, it is obvious that other methods can be employed. Thus, for example, under certain conditions, a heat treatment whereby volatile materials are substantially removed may be sufficient.

The polymers of the present invention can be employed in various ways. For example, they can be molded by compression or injection molding methods, extruded or otherwise formed. Furthermore, they are particularly adapted, as has been previously stated, to be employed in coating or impregnating compositions because of their solubility, non-inflammability, rubbery character and clarity in film form. Polymeric 1-chloro-1-fluoro-ethylene may be employed alone and in admixture with added materials of various types, as for example, dyes, pigments, fillers, plasticizers and other polymerized or polymerizable materials.

This invention is limited solely by the claims attached hereto.

What is claimed:

1. Polymeric 1-chloro-1-fluoro-ethylene.

2. A process of preparing a new chemical product comprising polymerizing 1-chloro-1-fluoro-ethylene in the presence of a peroxide catalyst.

3. A process of preparing a new chemical product comprising polymerizing 1-chloro-1-fluoro-ethylene in the presence of an organic peroxide catalyst.

4. A process of preparing a new chemical product comprising polymerizing 1-chloro-1-fluoro-ethylene in the presence of acetyl peroxide.

5. A process of preparing a new chemical product comprising polymerizing 1-chloro-1-fluoro-ethylene at a temperature below substantially 50° C. in the presence of an organic peroxide catalyst.

6. A process of preparing a new chemical product possessing a rubbery character comprising polymerizing 1-chloro-1-fluoro-ethylene at a temperature below substantially 50° C. in the presence of acetyl peroxide.

7. A thermoplastic polymer of 1-chloro-1-fluoro-ethylene.

8. A thermoplastic rubbery solid polymer of 1-chloro-1-fluoro-ethylene.

MARY W. RENOLL.